H

(12) United States Patent
Dywan

(10) Patent No.: US 9,150,998 B2
(45) Date of Patent: Oct. 6, 2015

(54) METHOD AND APPARATUS FOR PRODUCING DETAILED FABRIC APPLIQUE

(71) Applicant: J. Michael Dywan, Phoenix, AZ (US)

(72) Inventor: J. Michael Dywan, Phoenix, AZ (US)

( * ) Notice: Subject to any disclaimer, the term of this patent is extended or adjusted under 35 U.S.C. 154(b) by 0 days.

(21) Appl. No.: 13/999,057

(22) Filed: Jan. 7, 2014

(65) Prior Publication Data

US 2015/0060399 A1  Mar. 5, 2015

Related U.S. Application Data

(60) Provisional application No. 61/959,654, filed on Aug. 29, 2013.

(51) Int. Cl.
| | | |
|---|---|---|
| *C23F 1/02* | (2006.01) |
| *D06H 7/24* | (2006.01) |
| *D06H 7/00* | (2006.01) |
| *C23F 1/04* | (2006.01) |
| *C23F 4/00* | (2006.01) |
| *B23P 15/40* | (2006.01) |
| *B44C 3/08* | (2006.01) |
| *B26F 1/00* | (2006.01) |
| *B26F 1/38* | (2006.01) |
| *B26F 1/42* | (2006.01) |
| *B21D 37/20* | (2006.01) |

(52) U.S. Cl.
CPC ............... *D06H 7/24* (2013.01); *B21D 37/205* (2013.01); *B23P 15/406* (2013.01); *B26F 1/00* (2013.01); *B26F 1/384* (2013.01); *B26F 1/42* (2013.01); *B44C 3/082* (2013.01); *C23F 1/02* (2013.01); *C23F 1/04* (2013.01); *C23F 4/00* (2013.01); *D06H 7/00* (2013.01); *D06H 7/005* (2013.01)

(58) Field of Classification Search
CPC ............... C23F 1/04; C23F 1/02; C23F 4/00; B23P 15/406; H05K 2203/0108; B44C 3/082; B26F 1/44; B26F 2001/4472; B26F 1/00; B26F 1/384; B26F 1/42; B26F 2210/16; B21D 37/205
See application file for complete search history.

(56) References Cited

U.S. PATENT DOCUMENTS 5,248,383 A * 9/1993 Hanada ..................... 216/108

\* cited by examiner

*Primary Examiner* — Lan Vinh
*Assistant Examiner* — Jiong-Ping Lu
(74) *Attorney, Agent, or Firm* — Tod R. Nissle, P.C.

(57) ABSTRACT

A method to produce a fabric applique includes the steps of providing a piece of steel, removing oxide layers from the steel, and forming a pattern on the steel. The steel is etched and coded. A die cutting laminate including the coded steel is prepared and compressed to cut fabric.

2 Claims, 7 Drawing Sheets

FROM FIG. 1

IF NECESSARY, PERFORM A SECOND ETCH TO (A) ETCH THE INTERMEDIATE PORTIONS TO A SECOND DEPTH GREATER THAN THE FIRST SELECTED DEPTH AND IN THE RANGE OF 0.027 TO 0035 INCH, (B) ROUND THE CUTTING EDGE PORTIONS, AND (C) PRODUCE A SAFETY DIE. _14_

APPLY 0.0006 TO 0.0012 INCH THICK NON-STICK COATING TO STEEL SURFACES TO ROUND EDGES AND LIMIT CORROSION. _14A_

PROVIDE A PAIR OF SPACE APART PARALLEL ROLLERS. _15_

PROVIDE A PLURALITY OF FABRIC SECTIONS TO BE CUT BY THE SAFETY DIE, EACH SECTION HAVING A THICKNESS OF LESS THAN 0.010 INCH. _16_

PROVIDE A THIN METAL PLATE HAVING A THICKNESS OF AT LEAST 0.012 INCH. _17_

PROVIDE A PAIR OF POLYMER BOUNDING SHEETS. _18_

FROM FIG. 2

FORM A DIE CUTTING LAMINATE PACKAGE BY SANDWICHING THE SAFETY DIE, THE FABRIC SECTIONS, AND THE METAL PLATE BETWEEN THE POLYMER SHEETS WITH (A) THE FABRIC SECTIONS CONTACTING AND GENERALLY IN REGISTRATION WITH EACH OTHER, (B) THE CUTTING EDGE PORTIONS OF THE DIE CONTACTING ONE OF THE FABRIC SHEETS. _19_

FEED THE DIE CUTTING LAMINATE PACKAGE BETWEEN THE ROLLERS TO COMPRESS THE LAMINATE PACKAGE AND CAUSE THE ROUNDED CUTTING EDGE PORTIONS TO COMPRESS AND CUT THROUGH THE FABRIC SECTION TO PRODUCE A PLURALITY OF DETAILED FABRIC PIECES OF EQUAL SHAPE AND DIMENSION. _20_

ATTACH EACH DETAILED FABRIC PIECE TO A SUBSTRATE. _21_

*FIG. 3*

FIG. 6
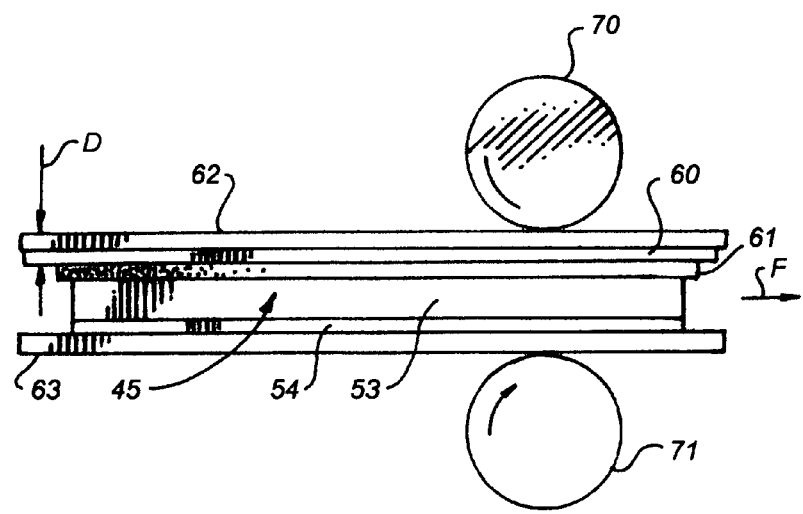
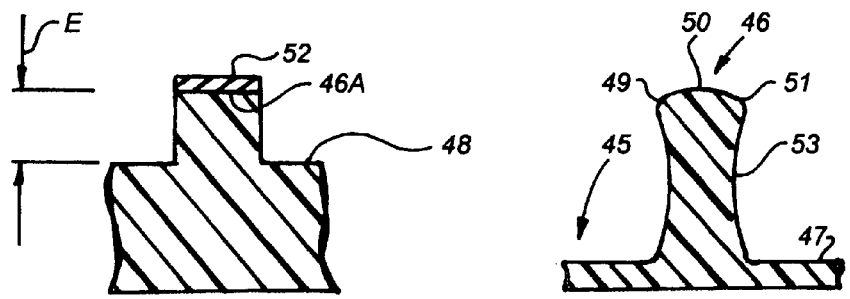
FIG. 7      FIG. 8

METHOD AND APPARATUS FOR PRODUCING DETAILED FABRIC APPLIQUE

This application claims priority based on provisional application Ser. No. 61/959,654, filed Aug. 29, 2013.

This invention pertains to fabric.

More particularly, the invention pertains to a method and apparatus for producing a piece of fabric having a desired shape and dimension.

Fabric pieces have for many years had a variety of applications. One well known use of fabric pieces consists of stitching together such pieces to produce a quilt. Another use consists of stitching or otherwise fastening together fabric pieces to produce an article of clothing. Still a further use of fabric pieces is to adhere or otherwise fasten fabric pieces to paper, cloth, or another desired substrate.

Those of skill in the art have for centuries endeavored to develop improved and novel methods of producing and applying pieces of fabric.

It would be desirable to provide an improved method and apparatus for producing and utilizing fabric pieces.

Therefore, it is a principal object of the instant invention to provide an improved system for an individual to provide fabric pieces which can be utilized in any of a variety of applications.

This and other, further and more specific objects and advantages of the invention will be apparent from the following detailed description thereof, taken in conjunction with the drawings, in which:

FIG. 2 is a block flow diagram further illustrating an improved method in accordance with a preferred embodiment of the invention;

FIG. 3 is a block flow diagram further illustrating an improved method in accordance with a preferred embodiment of the invention;

FIG. 6 is a side view illustrating the mode of operation of apparatus utilized in the practice of the invention;

FIG. 7 is a side section view illustrating a die cutting edge after a first etching process is completed;

FIG. 8 is a side section view illustrating a die cutting edge after a second etching process is completed;

Briefly, in accordance with the invention provided is an improved method to produce a fabric applique. The method comprises the steps of providing a piece of high carbon non-stainless steel including more than 0.3% by weight carbon and exterior surfaces having oxide layers; removing the oxide layers from the exterior surfaces; and, forming a detailed pattern on the steel. The pattern comprises a plurality of intermediate cover portions not comprising photo resist and, photo resist cover portions bounding the intermediate portions and having a width greater than the desired final thickness of a die cutting edge. The photo resist cover portions have a thickness in the range of 0.0025 inch to 0.0055 inch. The method also includes the step of etching through the intermediate cover portions and etching the steel beneath the intermediate cover portions to produce in the steel beneath the intermediate cover portions a depth in the range of 0.027 inch to 0.035 inch; to round said die cutting edge portion; and, produce a safety die. The method also includes the steps of promptly after the etching is completed removing the photo resist cover portions from the safety die; promptly after the photo resist cover portions are removed applying to the safety die a protective non-stick coating having a thickness in the range of 0.0008 to 0.0012 inch to round edges on the die and minimize corrosion of the safety die; providing a pair of spaced apart parallel rollers; providing a stack of a plurality of fabric sections to be cut by the safety die, each fabric section having a thickness of less than 0.010 inch; providing a thin metal plate having a thickness of at least 0.010 inch; providing a pair of polymer bounding sheets; and, forming a die cutting laminate package by sandwiching the die, the stack of fabric sections, and the metal plate between the polymer sheets with the fabric sections contacting and generally in registration with each other, and the cutting edge portions contacting one of the fabric sections. The method also includes the steps of feeding the die cutting laminate package intermediate the rollers such that the rollers compress the laminate package and cause the rounded cutting edge portions to compress and cut through the stack of fabric sections to produce a plurality of detailed fabric pieces of equal shape and dimension; and, attaching each of said detailed fabric pieces to a substrate. The stack of fabric sections can include at least six fabric sections generally of equal shape and dimension and in registration with one another.

Figure 1:
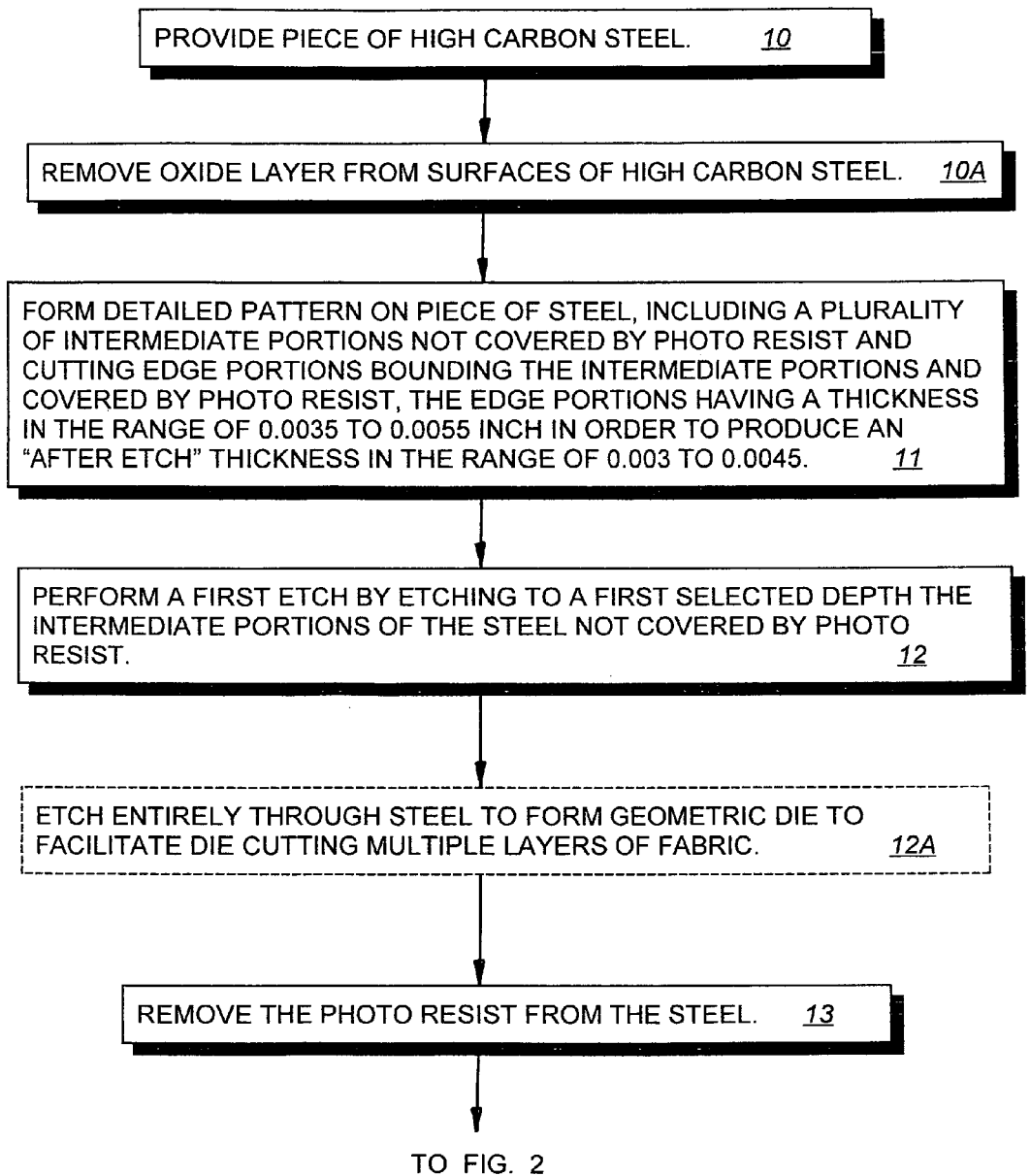
FIG. 1 is a block flow diagram illustrating an improved method in accordance with a preferred embodiment of the invention.

Turning now to the drawings, which depict the presently preferred embodiments of the invention for the purpose of illustrating the practice thereof and not by way of limitation of the scope of the invention, and in which like reference characters refer to corresponding elements throughout the several views, FIGS. 1 to 3 illustrate a method to produce a fabric applique in accordance with a preferred embodiment of the invention.

The first step comprises providing a piece of high carbon steel containing at least 0.3% by weight carbon. The shape and dimension of the piece of steel can vary as desired, but the steel typically comprises a plate and includes an upper surface and a bottom surface parallel to the upper surface. As will be seen in the following steps, the steel is processed to produce a safety die. High carbon steel typically contains from 0.3% to 1.5% by weight carbon. The use of high carbon steel is critical in the practice of the invention.

The next step 10A comprises removing the oxide layer from the exterior surfaces of the steel plate. Any desired method can be utilized to accomplish this step, but a fine pumice powder is presently preferably used to abrade the oxide layer from the exterior surfaces of the steel plate. This step is important in the practice of the invention both to facilitate the adherence of photo resist to surfaces of the plate and to facilitate the adherence of the protective spray coating applied in step 14A set forth below. The spray coating is critical because it minimizes the corrosion of the steel and functions to round sharp edges in the die to reduce the likelihood that the die injure an individual utilizing the die.

The second step 11 consists of forming a detailed pattern on the upper surface of the steel. The pattern defines the cutting edges of a die. While any desired method can be utilized to form such a pattern, in one presently preferred embodiment of the invention, a pattern is formed on a sheet or layer of light sensitive material by illuminating selected portions or areas of the sheet through open areas in a mask which is placed in registration with the sheet. In an alternate approach, a layer of light sensitive material is formed on a surface of the piece of steel, after which the layer of light sensitive material is activated by subjecting selected areas of the layer of material to illumination to produce acid resistant areas in the layer.

Figure 4:
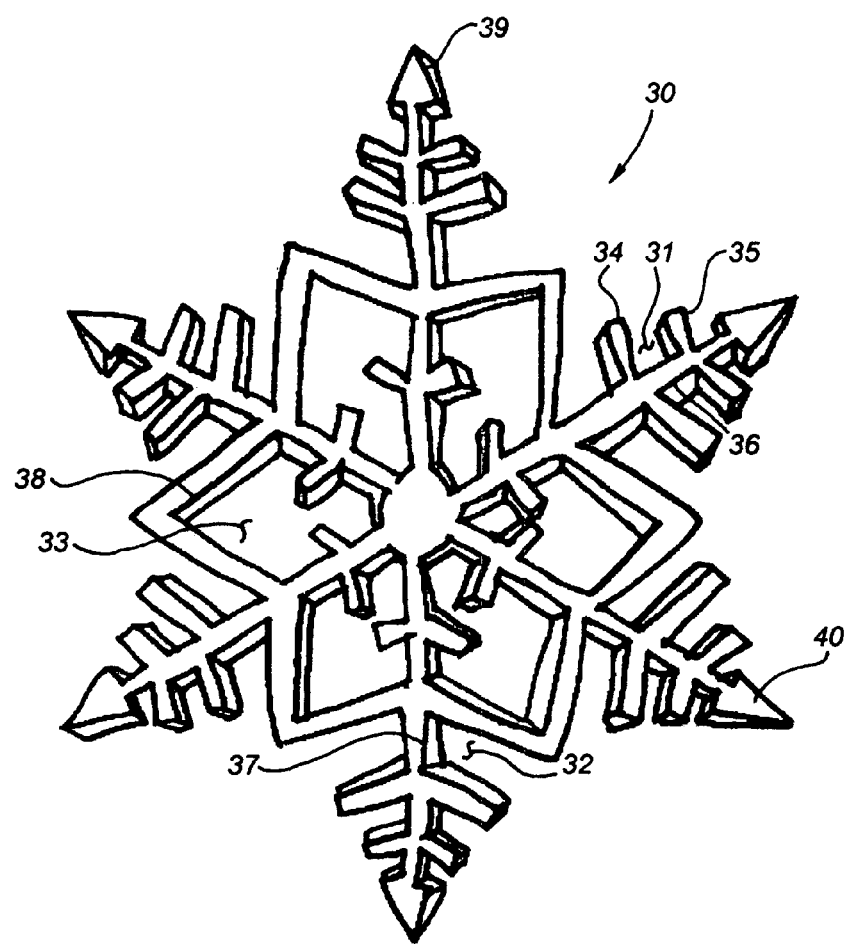
FIG. 4 is a perspective view illustrating a fabric applique produced in accordance with the invention.

The illuminated or "exposed" areas are referred to as photo resist cover portions because they are acid resistant and comprise the pattern. The non-illuminated intermediate cover portions or areas of the light sensitive material are not acid resistant and do not comprise photo resist. Each activated sheet of light sensitive material is adhered to a surface of the piece of steel. By way of example, the exposed acid-resistant cover portions (i.e., the photo resist areas or "photo resist") and the non-exposed intermediate portions of the activated light sensitive material can, when the steel piece is subjected to acid etching, produce die cutting edges which, when the die is used to cut a piece of fabric, produce the snow flake applique illustrated in FIG. 4. Adhering the activated light sensitive sheet of material to a surface of a piece of steel forms a pattern on the surface of the steel.

After the activated sheet is adhered to the surface of the piece of steel, the steel is subjected to a first etch 12 by exposing the steel to a first acid etch solution for a selected period of time. The solution dissolves the non-exposed intermediate cover portions or areas of the light sensitive material and dissolves metal from the areas of metal that were covered by said intermediate portions. Metal is not dissolved from areas of the piece of steel which are covered by photo resist cover areas of the activated light sensitive sheet of material.

FIG. 7 is a section view of a portion of the steel plate after the first etch. A photo resist cover portion 52 of the activated light sensitive material remains and protects a portion of the plate. The non-exposed intermediate cover portions of the light sensitive sheet were dissolved, and steel below such non-exposed portions were dissolved to form floor 48. The distance from the cutting edge 46A to floor 48 is indicated by arrows E and is presently about 0.005 inch, although this can vary as desired.

Figure 5:
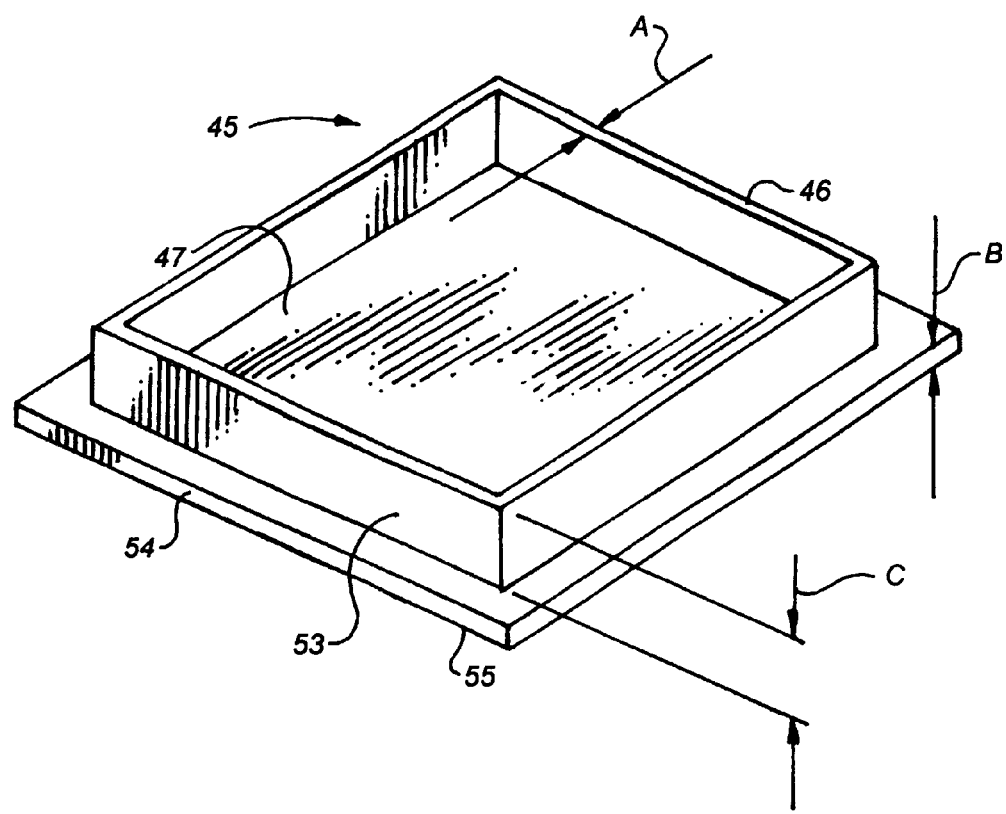
FIG. 5 is a perspective view illustrating a safety die produced and constructed in accordance with the invention.

FIG. 8 is a section view of the portion of the steel plate illustrated in FIG. 7 after all of the exposed photo resist areas 52 are removed 13 (FIG. 1) from the plate and the plate is exposed to a second etch 14 (FIG. 1) to produce a floor 47. The distance from cutting edge 46 to floor 47 of a completely etched die 45 is indicated in FIG. 5 by arrows C and is presently in the range of 0.027 inch to 0.035 inch. The width of cutting edge 46 of die 45 is indicated in FIG. 5 by arrows A and is presently in the range of 0.003 inch to 0.0045 inch. This width is considerably greater than that found in conventional steel rule dies and enhances the safety feature of the die of the invention. After the second etch is completed, the width of base 54 (i.e., the distance from floor 47 to bottom 55) is indicated by arrows B and is presently in the range of 0.005 inch to 0.008 inch. If desired, only a single etch step can be utilized. The two step etch procedure described above is, however, presently preferred when the width of edge 46 after the completion of the first etch is too great, because it facilitates production of the rounded "cutting" edge 46 illustrated in FIG. 8, and because it facilitates production of a die 45 having a greater depth, which depth is indicated by arrows C in FIG. 5. In FIG. 5, die 45 includes wall 53, bottom surface 55 and a base having a peripheral edge 54.

Since the etching solution dissolves metal from the sides of wall 53, particularly when the wall has a greatly increased depth in the range of in the range of 0.027 inch to 0.035 inch, it is critical in the practice of the invention for photo resist to cover an edge width which is 0.0004 to 0.001 inch wider than the desired "final" edge width which remains after etching is complete and which is in the range of 0.003 inch to 0.0045 inch. Consequently, the width of photo resist covering a cutting edge portion of a steel plate is in the range of 0.0034 to 0.0055 inch.

Importantly, the cutting edge 46 illustrated in FIG. 8 includes a slightly rounded convex top 50 and rounded edges 49, 51. As a result, edge 46 is safer than a cutting edge which consists of a knife edges and which is found in, for example, steel rule dies; and, dies with edges 46 configured in accordance with the invention in the manner illustrated in FIG. 8 are considered to be safety dies. Steel rule dies require protective foam around the cutting edges of the dies; the dies of the invention do not require protective foam. Further, dies produced in accordance with the invention are, in comparison to steel rule dies, thinner, more readily stacked, and susceptible to producing greater detail. A surprising result encountered in the use of the rounded cutting edge 46 is that it effectively cuts fabric. It is conjectured that this is that case because the small width (0.003 to 0.0045 inch) of edge 46 permits edge 46 to "cut" by compressing rounded top 50 against a piece of fabric.

The 0.027 inch to 0.035 inch depth of die 45 has been determined to be critical in the practice of the invention when die 45 is utilized to cut fabric. Fabric tends to bunch around and engage and interfere with the functioning of cutting edges 46, particularly when multiple layers of fabric are being cut. Experimentation produced a surprising result in that simply increasing the depth of die 45 to the critical range of 0.027 to 0.035 generally eliminated the problem, apparently because additional space permits fabric to better move away from and not interfere with edges 46.

FIG. 5 illustrates a simple die 45 which results when a piece of steel has been subjected to the two step etch set forth above.

Figure 9:
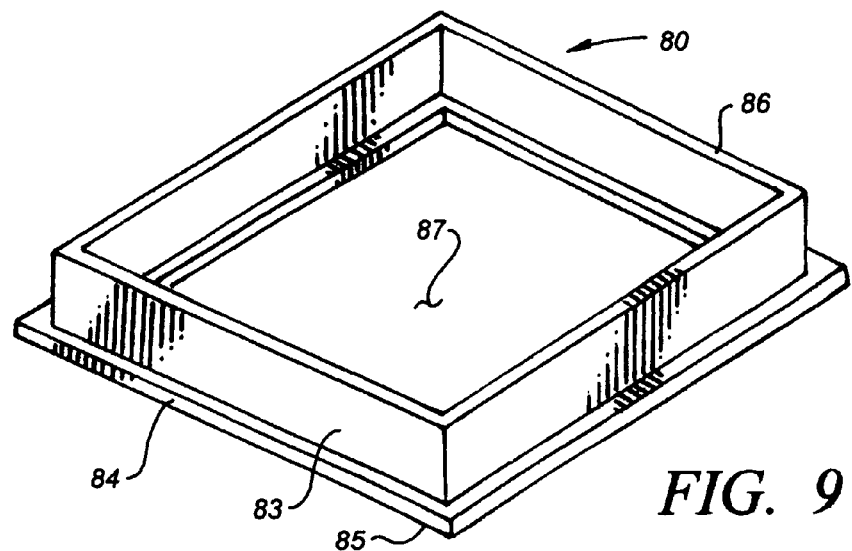
FIG. 9 is a perspective view illustrating another safety die produced and constructed in accordance with the invention; and, FIG. 10 is a perspective view illustrating still another safety die produced and constructed in accordance with the invention.

As indicated in step 12A, the first etch (or second etch) can dissolve and etch completely through portions of a steel plate, particularly when a geometric die is being produced. Such a resulting geometric die 80 is illustrated in FIG. 9. The central area 87 of die 80 is completely open; there is no "floor" comparable to floor 47 in FIG. 5. Such an open configuration significantly enhances the ability of die 80 to prevent the fabric bunching problem described above. The open area provides space into which excess fabric can travel and occupy when multiple layers of fabric are being cut.

In step 14A, a 0.0006 to 0.0012 inch thick non-stick coating is applied to a die 45 after the etching process is completed. The coating functions to round edges of the die and to limit corrosion, and will not stick to fabric cut by the die. Any of methods well known in the art can be utilized to apply the coating. The presently preferred method of coating is to spray a mist onto the surfaces of the die. It is critical that the coating be applied promptly after the etching process is completed and the photo resist is removed, namely, within one hour, preferably within forty-five minutes, more preferably within thirty minutes, and most preferably within fifteen minutes after the etching process is completed. After etching is completed, the photo resist is also promptly removed with these time periods. In other words, most preferably the photo resist is removed and the die is sprayed within fifteen minutes after the etching process is completed. It is also critical that the thickness of the coating be within the range of 0.0006 to 0015 inch, preferably 0.0008 to 0.0012 inch. If the coating is too thick, cutting action by the die is inhibited. If the coating is too thin the die edges are sharper, and less safe; the non-stick function of the coating is inhibited, and the anti-corrosive action of the coating is impaired.

Die 45 is preferably fabricated from high carbon steel. A wide variety of coatings for high carbon steel are known in the art. High carbon steel is heat treated to make it exceptionally hard. This hardness is critical in enabling die of the invention to hold up to the pressure created by press rollers 70, 71. See, for example, Dayton Steel, Ohio, USA.

In step 15, a pair 70, 71 (FIG. 6) of spaced apart parallel rollers is provided.

In step 16 a plurality of fabric pieces or sections 61 (FIG. 6) to be cut by the die 45 are provided. Each fabric section has a thickness of less than 0.010 inch, and typically is of a size that is comparable to the other fabric pieces.

In step 17 a thin metal plate 60 having a thickness of at least 0.012 inch is preferred. The thickness of the plate has been determined to be critical in the practice of the invention. If the thickness of the plate is not great enough, the effectiveness of the invention is significantly impaired. Further, a plate consisting of metal is utilized because it provides the requisite hardness, and prevents a die from simply crushing portion of fabric and turning those portions to powder, and from producing a fabric piece having only a partially cut peripheral edge. For example, the plate 60 presently is comprised of stainless steel, aluminum or another metal which is not as hard as the high carbon steel. Plate 60 limits the compression of the polymer sheets 62, 63 and in doing so allows a less flexible surface for cutting fabric to enhance the efficiency of the cutting function of the die. In order for the plate 60 (FIG. 6) to provide the support necessary to cut fabric, the plate should have a thickness of at least 0.010 inch, preferably 0.011 inch, and most preferably at least 0.012 inch. Surprisingly, in FIG. 6, plate 60 can, instead of being inserted intermediate fabric layers 61 and bounding sheet 62 (i.e., on top of the fabric layers), be inserted between die 45 and bounding sheet 63, i.e., be inserted under the die 45.

In step 18 a pair 62, 63 of bounding sheets are provided. While the material used to produce these sheets can vary as desired, it is presently preferred that the sheets comprise a polymer like, for example, LEXAN™. The thickness of the sheets presently is in the range of 0.012 inch to 0.075 inch. Sheets 62, 63 produced from metal are not preferred because the pressure produced by rollers 70, 71 will deform the metal. Metal plate 60 limits the compression of the polymer sheets 62, 63 used in the outer layers of the die cutting "sandwich". Further, LEXAN™ and other comparable polymer materials normally will not shatter under high pressure.

In step 19, a die cutting laminate package is produced by sandwiching the safety die 45, fabric sections 61, and metal plate 60 between the polymer sheets 62 and 63 with (a) the fabric sections each contacting at least one other fabric section and generally in registration with the other fabric sections, and (b) the cutting edge(s) 46 of die 45 contacting one of the fabric sections 61. FIG. 6 illustrates one such die cutting package.

In step 20, the die cutting laminate package is fed between rollers 70 and 71 in the direction of arrow F in FIG. 6 to compress the laminate package and cause the rounded cutting edge(s) 46 to compress and cut through the fabric sections 61 to produce a plurality of detailed fabric pieces of equivalent shape and dimension.

In step 21 each detailed fabric piece is attached to a substrate.

As used herein a detailed fabric piece or applique is a unitary piece of fabric having a shape and dimension comprising more than simple planar geometric shape that has a single continuous peripheral edge circumscribing the piece of fabric. Simple geometric shapes include circles, rectangles, triangles, squares, trapezoids, parallelograms, ellipses, and rhomboids. A circular piece of fabric in which portions of the fabric intermediate the circular peripheral edge of the fabric have not been cut out comprises a piece of fabric having a simple geometric shape. Simple geometric shapes include peripheral edges comprised only of straight lines or convex arcuate lines. The circumference of a circle or ellipse comprises a convex arcuate line. The side of a square comprises a straight line. A unitary detailed fabric piece, in addition to having a continuous peripheral edge, has portions of the fabric intermediate the peripheral edge removed, includes detents, includes multiple simple geometric shapes, or includes a peripheral edge which includes a least one concave border section. The detailed snowflake fabric piece in FIG. 4 includes, by way of example, detents 36 and 37, includes multiple simple geometric shapes 39 and 40, and includes areas 33 which are intermediate the peripheral edge of the snowflake piece 30 and from which fabric has been removed. There are no concave border sections in piece 30. If, however, the fabric immediately bounding and circumscribing area 33 were, instead of having the general diamond shape 38 shown in FIG. 4, had an elliptical shape, then piece 30 would include a concave border.

U-shaped detent 36 includes arms 34 and 35 and partially bounds area 31. Detent 37 partially bounds area 32.

As utilized herein a fabric comprises a woven material. One example of woven material has the following specifications:

Material: Cotton yarn
Style No.: 55116
Weight: 1.5 inches per square yard
Thickness: Approximately three-thousands of an inch
Type of Weave: Plain
Warp: 30 denier cotton yarn. 240 yarns per inch, 26 filaments per yarn.
Fill: 20 denier cotton yarn. 200 yarns per inch, 7 filaments per yarn.
Color: White
Coating: None While the method and apparatus of the invention were developed during research in connection with cutting fabric, it is anticipated that said method and apparatus may be utilized to cut other materials such as paper, cork, etc.

Figure 10:
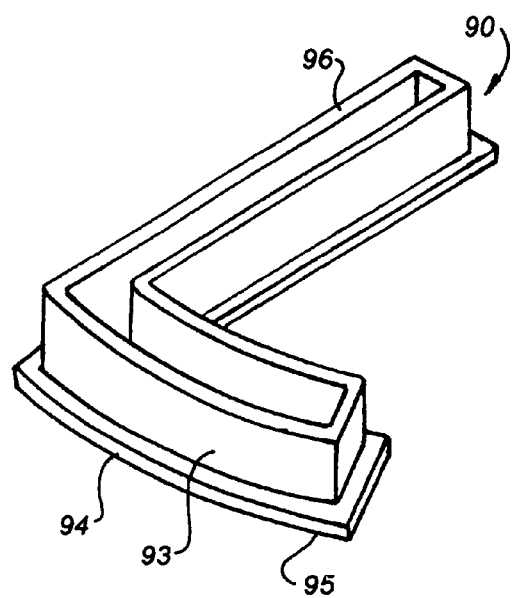

The die 90 illustrated in FIG. 10 includes cutting edge 96, wall 93, bottom surface 95 and a base with edge 94 and produces an L-shaped piece of fabric when die 90 cuts through a piece of fabric. When relatively small designs or pieces of fabric are cut from cloth with a die 90, the cloth typically has a layer of contact adhesive on the back of the cloth and the adhesive is covered by a removable backing. After a design is cut from such cloth, the packing is peeled off to expose the adhesive. The design is pressed against a mounting surface and heated such that the adhesive melts and contacts the mounting surface and secures the design to the mounting surface. Small pieces of fabric are too difficult to stitch to a surface. As a result, adhesive backing often is used on fabric to facilitate mounting designs on desired surfaces.

Having described my invention in such terms as to enable those of skill in the art to understand and use it, and having described the presently preferred embodiments and best mode thereof, I claim:

1. A method to produce a fabric applique, comprising the steps of:
   (a) providing a piece of high carbon non-stainless steel including
      (i) more than 0.3% by weight carbon and
      (ii) exterior surfaces having oxide layers;
   (b) removing oxide layers from said exterior surfaces;

(c) forming a detailed pattern on said steel, said pattern comprising
  (i) a plurality of intermediate cover portions not comprising photo resist and,
  (ii) photo resist cover portions bounding said intermediate portions and having a width greater than the desired final thickness of a die cutting edge,
  said photo resist cover portions having a thickness in the range of 0.0034 inch to 0.0055 inch;
(d) etching through said intermediate cover portions and etching said steel beneath said intermediate cover portions to produce
  (i) in said steel beneath said intermediate cover portions a depth in the range of 0.027 inch to 0.035 inch,
  (ii) a rounded die cutting edge, and
  (iii) a safety die;
(e) promptly after said etching is completed removing said photo resist cover portions from said safety die;
(f) promptly after said photo resist cover portions are removed applying to said safety die a protective non-stick coating having a thickness in the range of 0.0008 to 0.0012 inch to round edges on said die and minimize corrosion of said safety die, said non-stick coating not sticking to fabric;
(g) providing a pair of spaced apart parallel rollers;
(h) providing a stack of a plurality of fabric sections to be cut by said safety die, each fabric section having a thickness of less than 0.010 inch;
(i) providing a thin metal plate having a thickness of at least 0.010 inch;
(j) providing a pair of polymer bounding sheets;
(k) forming a die cutting laminate package by sandwiching said die, said stack of fabric sections, and said metal plate between said polymer sheets with said
  (i) fabric sections contacting and generally in registration with each other, and
  (ii) cutting edge portions contacting one of said fabric sections;
(l) feeding said die cutting laminate package intermediate said rollers such that said rollers compress said laminate package and cause said rounded cutting edge portions to compress and cut through said stack of fabric sections to produce a plurality of detailed fabric pieces of equal shape and dimension; and,
(m) attaching each of said detailed fabric pieces to a substrate.

2. The method of claim 1 where said stack includes at least six fabric sections generally of equal shape and dimension and in registration with one another.

\* \* \* \* \*